US010153970B2

(12) United States Patent
Valliappan et al.

(10) Patent No.: US 10,153,970 B2
(45) Date of Patent: Dec. 11, 2018

(54) PARTIAL CHANNEL RESERVATION ON A SHARED COMMUNICATION MEDIUM

(71) Applicant: QUALCOMM Incorporated, San Diego, CA (US)

(72) Inventors: Nachiappan Valliappan, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 14/948,668

(22) Filed: Nov. 23, 2015

(65) Prior Publication Data

US 2016/0150536 A1 May 26, 2016

Related U.S. Application Data

(60) Provisional application No. 62/085,233, filed on Nov. 26, 2014.

(51) Int. Cl.
*H04W 72/04* (2009.01)
*H04W 28/26* (2009.01)
*H04L 12/741* (2013.01)
*H04W 16/14* (2009.01)
*H04W 88/06* (2009.01)
*H04W 74/08* (2009.01)
(Continued)

(52) U.S. Cl.
CPC .............. *H04L 45/74* (2013.01); *H04W 16/14* (2013.01); *H04W 74/0816* (2013.01); *H04W 88/06* (2013.01); *H04L 5/001* (2013.01); *H04W 72/1215* (2013.01)

(58) Field of Classification Search
None
See application file for complete search history.

(56) References Cited

U.S. PATENT DOCUMENTS

2011/0250858 A1  10/2011  Jain et al.
2012/0082077 A1  4/2012  Zhang et al.
(Continued)

FOREIGN PATENT DOCUMENTS

WO    2008144323 A1    11/2008

OTHER PUBLICATIONS

International Search Report and Written Opinion—PCT/US2015/062312—ISA/EPO—dated Feb. 8, 2016.

*Primary Examiner* — Kevin C. Harper
*Assistant Examiner* — Derrick V Rose
(74) *Attorney, Agent, or Firm* — Muncy, Geissler, Olds & Lowe, P.C.

(57) ABSTRACT

Systems and methods for co-existence between wireless Radio Access Technologies (RATs) employing channel reservation on a shared communication medium are disclosed. One or more channel reservation messages defined for a first RAT may be received to reserve the communication medium for a reservation duration, with the communication medium comprising a plurality of component channels. A first component channel may be determined among the plurality of component channels to be protected for operation of a second RAT in accordance with the one or more channel reservation messages. Communication via the first RAT may nevertheless proceed on a second component channel among the plurality of component channels during the reservation duration.

30 Claims, 8 Drawing Sheets

(51) Int. Cl.
    *H04L 5/00*     (2006.01)
    *H04W 72/12*    (2009.01)

(56) References Cited

U.S. PATENT DOCUMENTS

| | | | |
|---|---|---|---|
| 2014/0050203 A1* | 2/2014 | Doppler | H04W 16/14 370/336 |
| 2014/0112175 A1* | 4/2014 | Pantelidou | H04W 28/26 370/252 |
| 2015/0063099 A1 | 3/2015 | Sadek | |
| 2015/0085684 A1 | 3/2015 | Sadek | |
| 2015/0163805 A1 | 6/2015 | Cattoni et al. | |
| 2015/0223075 A1* | 8/2015 | Bashar | H04W 16/14 370/329 |
| 2015/0250002 A1 | 9/2015 | Sun et al. | |
| 2015/0288427 A1* | 10/2015 | Wang | H04W 72/1273 370/329 |
| 2016/0037520 A1* | 2/2016 | Wang | H04W 72/0453 370/329 |

* cited by examiner

PARTIAL CHANNEL RESERVATION ON A SHARED COMMUNICATION MEDIUM

CROSS-REFERENCE TO RELATED APPLICATIONS

The present Application for Patent claims the benefit of U.S. Provisional Application No. 62/085,233, entitled "Channel Reservation Co-Existence in Unlicensed Spectrum," filed Nov. 26, 2014, assigned to the assignee hereof and expressly incorporated herein by reference in its entirety.

INTRODUCTION

Aspects of this disclosure relate generally to telecommunications, and more particularly to co-existence on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). One class of such multiple-access systems is generally referred to as "Wi-Fi," and includes different members of the Institute of Electrical and Electronics Engineers (IEEE) 802.11 wireless protocol family. Generally, a Wi-Fi communication system can simultaneously support communication for multiple wireless stations (STAs). Each STA communicates with one or more access points (APs) via transmissions on the downlink and the uplink. The downlink (DL) refers to the communication link from the APs to the STAs, and the uplink (UL) refers to the communication link from the STAs to the APs.

Another class of such multiple-access systems is generally referred to as a "cellular" network. Recently, cellular network "small cell," typically low-power base stations have begun to be deployed on the unlicensed frequency spectrum (e.g., the Unlicensed National Information Infrastructure (U-NII) band) used by Wireless Local Area Network (WLAN) technologies including Wi-Fi. The extension of small cell Long Term Evolution (LTE) operation, for example, is designed to increase spectral efficiency and hence capacity of the LTE system. However, it may also encroach on the operations of Wi-Fi and other native RATs utilizing the same unlicensed bands.

SUMMARY

The following summary is an overview provided solely to aid in the description of various aspects of the disclosure and is provided solely for illustration of the aspects and not limitation thereof.

In one example, a communication method is disclosed. The method may include, for example, receiving, via a first Radio Access Technology (RAT), one or more channel reservation messages defined for the first RAT to reserve a communication medium for a reservation duration, the communication medium comprising a plurality of component channels; determining a first component channel among the plurality of component channels to be protected for operation of a second RAT in accordance with the one or more channel reservation messages; and communicating, via the first RAT, on a second component channel among the plurality of component channels during the reservation duration.

In another example, a communication apparatus is disclosed. The apparatus may include, for example, a transceiver, at least one processor, and at least one memory coupled to the at least one processor. The transceiver may be configured to receive, via a first RAT, one or more channel reservation messages defined for the first RAT to reserve a communication medium for a reservation duration, the communication medium comprising a plurality of component channels. The at least one processor and the at least one memory may be configured to determine a first component channel among the plurality of component channels to be protected for operation of a second RAT in accordance with the one or more channel reservation messages. The transceiver may be further configured to communicate, via the first RAT, on a second component channel among the plurality of component channels during the reservation duration.

In another example, another communication apparatus is disclosed. The apparatus may include, for example, means for receiving, via a first RAT, one or more channel reservation messages defined for the first RAT to reserve a communication medium for a reservation duration, the communication medium comprising a plurality of component channels; means for determining a first component channel among the plurality of component channels to be protected for operation of a second RAT in accordance with the one or more channel reservation messages; and means for communicating, via the first RAT, on a second component channel among the plurality of component channels during the reservation duration.

In another example, a transitory or non-transitory computer-readable medium is disclosed. The computer-readable medium may include, for example, code for receiving, via a first RAT, one or more channel reservation messages defined for the first RAT to reserve a communication medium for a reservation duration, the communication medium comprising a plurality of component channels; code for determining a first component channel among the plurality of component channels to be protected for operation of a second RAT in accordance with the one or more channel reservation messages; and code for communicating, via the first RAT, on a second component channel among the plurality of component channels during the reservation duration.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to co-existence between wireless Radio Access Technologies (RATs) employing channel reservation on a shared communication medium. To improve the spectral efficiency of certain channel reservation protocols when co-opted by a competing RAT sharing the communication medium with the native RAT defining the channel reservation protocol, devices operating in accordance with the native RAT may be configured to protect only a desired subset of the communication medium being reserved (e.g., one or more component channels) while continuing to utilize other portions of the communication medium that may not be needed by the competing RAT. Detection of the competing RAT reservation and detection of the component channel(s) to be protected may be performed in different ways, including both implicit and explicit identification techniques. Other associated information, such as the intended usage by the competing RAT of the communication medium, may also be identified and used to adapt native RAT communication accordingly.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1A:
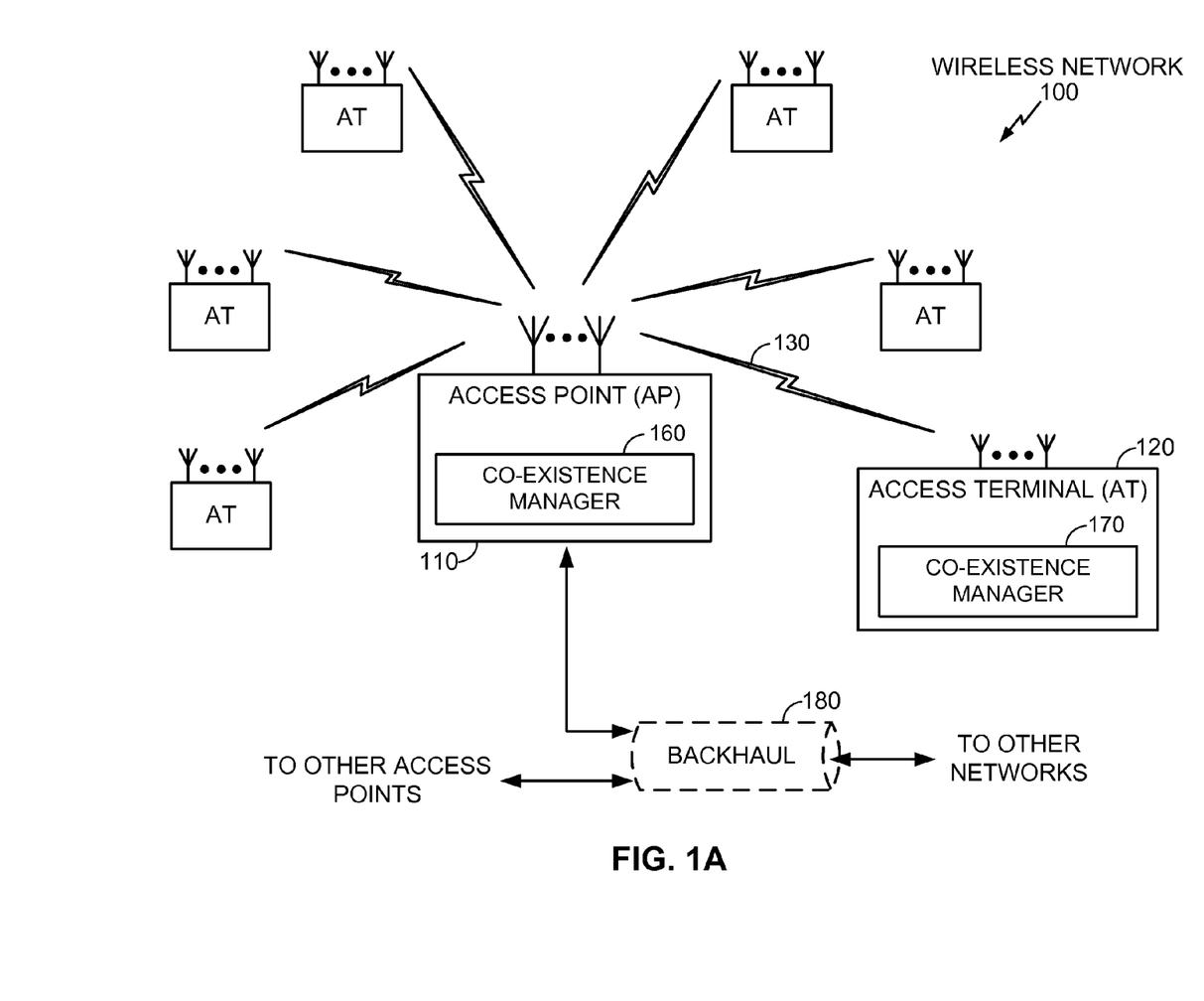
FIG. 1A is a system-level diagram illustrating an example wireless network.

FIG. 1A is a system-level diagram illustrating an example wireless network 100. As shown, the wireless network 100 is formed from several wireless nodes, including an access point (AP) 110 and an access terminal (AT) 120. Each wireless node is generally capable of receiving and/or transmitting over a wireless link 130. The wireless network 100 may support any number of access points 110 distributed throughout a geographic region to provide coverage for any number of access terminals 120. For simplicity, one access point 110 is shown in FIG. 1A as providing coordination and control among a plurality of access terminals 120, as well as providing access to other access points or other networks (e.g., the Internet) via a backhaul connection 180.

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc.

The wireless network 100 may correspond, for example, to a Wireless Local Area Network (WLAN), and may employ a variety of widely used networking protocols to interconnect nearby devices, including any member of the Institute of Electrical and Electronics Engineers (IEEE) 802.11 wireless "Wi-Fi" protocol family.

Figure 1B:
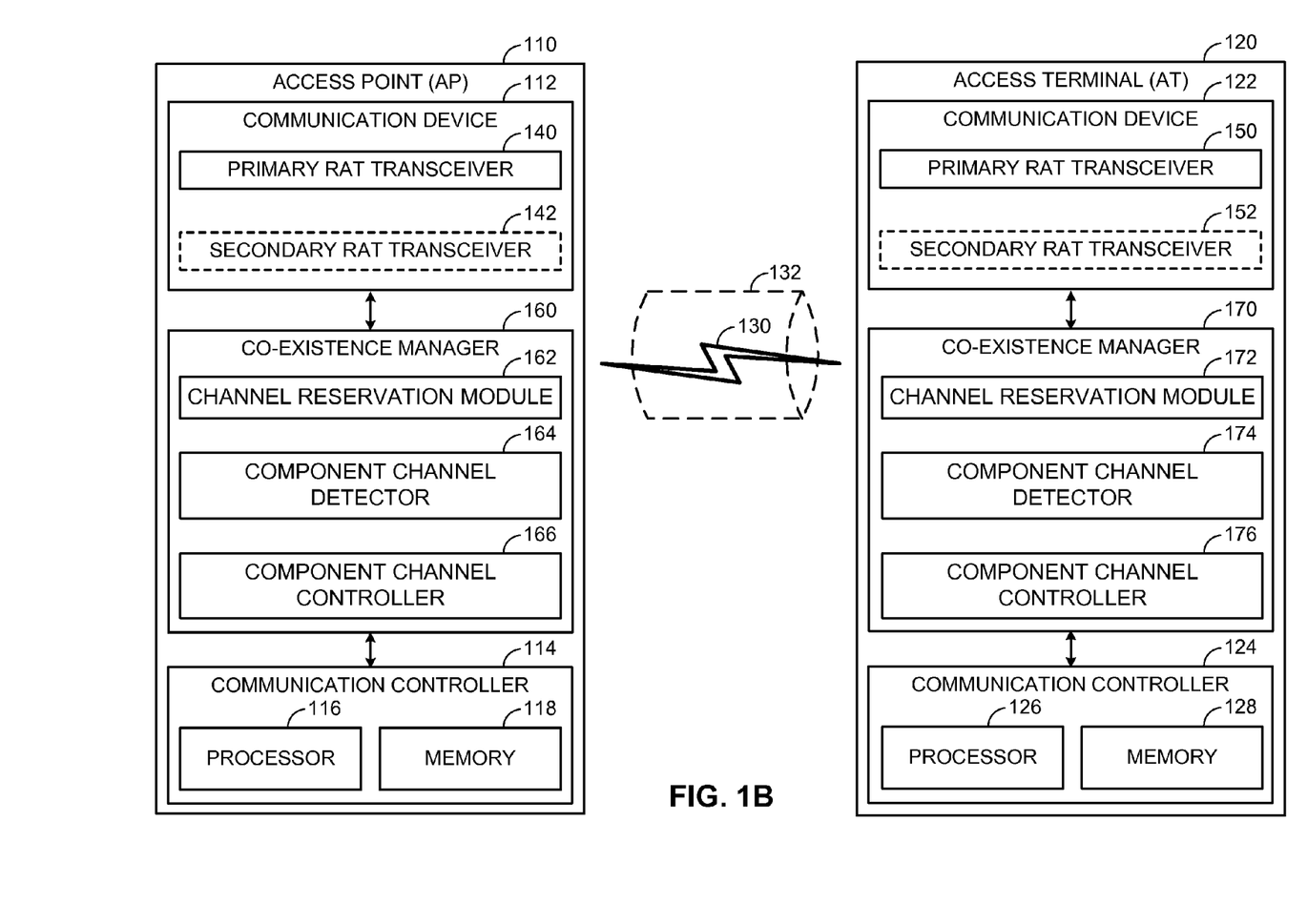
FIG. 1B is a device-level diagram illustrating example components of the access point and the access terminal of the wireless network in FIG. 1A in more detail.

FIG. 1B is a device-level diagram illustrating example components of the access point 110 and the access terminal 120 of the wireless network 100 in more detail. As shown, the access point 110 and the access terminal 120 may each generally include a wireless communication device (represented by the communication devices 112 and 122) for communicating with other wireless nodes via at least one designated RAT. The communication devices 112 and 122 may be variously configured for transmitting and encoding signals, and, conversely, for receiving and decoding signals in accordance with the designated RAT (e.g., messages, indications, information, pilots, and so on).

The communication devices 112 and 122 may include, for example, one or more transceivers, such as respective primary RAT transceivers 140 and 150, and, in some designs, co-located (optional) secondary RAT transceivers 142 and 152, respectively. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may include one or more processors 116 and 126, and one or more memories 118 and 128 coupled to the processors 116 and 126, respectively. The memories 118 and 128 may be configured to store data, instructions, or a combination thereof, either as on-board cache memory, as separate components, a combination, etc. The processors 116 and 126 and the memories 118 and 128 may be separate communication components or part of the respective host system functionality of the access point 110 and the access terminal 120.

Turning to the illustrated communication in FIGS. 1A-1B in more detail, the access point 110 and the access terminal 120 may transmit and receive messages via the wireless link 130, including information related to various types of communication (e.g., voice, data, multimedia services, associated control signaling, etc.), over a communication medium of interest shown by way of example in FIG. 1B as the communication medium 132. A communication medium of this type may be composed of one or more frequency, time, and/or space communication resources (e.g., encompassing one or more channels across one or more carriers) associated with communication between one or more transmitter/receiver pairs, such as the access point 110 and the access terminal 120 for the communication medium 132. The communication medium 132 may be shared with other communications as well as other RATs. As an example, the communication medium 132 may correspond to at least a portion of an unlicensed frequency band shared with other RATs. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by WLAN technologies, most notably IEEE 802.11x WLAN technologies generally referred to as "Wi-Fi."

As is further illustrated in FIGS. 1A-1B and will be described in more detail below, the access point 110 and/or the access terminal 120 may be variously configured in accordance with the teachings herein to provide or otherwise support the co-existence techniques discussed briefly above. For example, the access point 110 may include a co-existence manager 160, while the access terminal 120 may include a co-existence manager 170. In the illustrated example, the co-existence manager 160 of the access point 110 includes a channel reservation module 162, a component channel detector 164, and a component channel controller 166. Similarly, the co-existence manager 170 of the access terminal 120 includes a channel reservation module 172, a component channel detector 174, and a component channel controller 176. It will be appreciated, however, that the co-existence manager 160 and the co-existence manager 170 may be implemented in different ways, and that some or all of the functionality associated therewith may be implemented by or otherwise at the direction of at least one processor (e.g., one or more of the processors 116 and/or one or more of the processors 126) and at least one memory (e.g., e.g., one or more of the memories 118 and/or one or more of the memories 128).

In general, Wi-Fi and other RATs that may be utilized by the wireless network 100 provide interference mitigation protocols for avoiding or otherwise addressing the impact of both intra-RAT and inter-RAT interference. However, these interference mitigation protocols are typically more deferential to intra-RAT signaling than inter-RAT signaling. For example, the IEEE 802.11 protocol family of standards provides a Clear Channel Assessment (CCA) mechanism for assessing the state of the communication medium 132 prior to attempting transmission. The CCA Preamble Detection (CCA-PD) signaling energy threshold for yielding to other Wi-Fi traffic is substantially lower (e.g., −82 dBm) than the CCA Energy Detection (CCA-ED) threshold for avoiding inter-RAT signaling (e.g., −62 dBm for a primary 20 MHz channel).

Accordingly, other competing RATs that may be sharing the communication medium 132 have begun to co-opt certain intra-RAT interference mitigation protocols to facilitate one or more of their own co-existence schemes. For example, a Long Term Evolution (LTE) "small cell" base station operating on the communication medium 132 may utilize channel reservation messaging defined for the wireless network 100 (e.g., by native RATs such as Wi-Fi) to reserve the communication medium 132 and prevent the access point 110 and/or the access terminal 120 from transmitting for a reserved duration. Example channel reservation messages may include, for example, Clear-to-Send-to-Self (CTS2S) messages, Request-to-Send (RTS) messages, Clear-to-Send (CTS) messages, Physical Layer Convergence Protocol (PLCP) Signal (SIG) headers (e.g., a legacy signal (L-SIG), a high throughput signal (HT-SIG), or very high throughput signal (VHT-SIG)), a data packet such as a legacy 802.11a data packet, and the like for a Wi-Fi RAT, or other similar messages defined for other RATs of interest that may be implemented by the wireless network 100. Temporary channel reservation may help to facilitate various operations of the competing RAT, such as protecting downlink transmissions and avoiding inter-RAT collisions (e.g., as part of a Supplemental DownLink (SDL) co-existence transmission pattern), protecting downlink transmissions and detecting uplink transmissions (e.g., as part of a Stand-Alone (SA) co-existence transmission pattern), detecting radar transmissions (e.g., as part of a Dynamic Frequency Selection (DFS) function), managing co-located radio interactions (e.g., as part of an In-Device Co-existence (IDC) scheme), and so on.

At the same time, inter-RAT channel reservation may be inefficient from a medium utilization perspective by unduly restricting access point 110 and/or the access terminal 120 signaling, even when the competing RAT attempts to provide a favorable level of protection and foster fair co-existence. Inefficiencies may arise because the channel reservation mechanism employed is not designed for inter-RAT co-existence (e.g., disjointed in one way or another from the type of reservation required by the competing RAT), or for other reasons. For example, CTS2S messages are generally designed to reserve a relatively wide band of Wi-Fi channels (a primary channel plus all associated secondary channels) while an LTE small cell base station may intend to only utilize part of that spectrum. Techniques are accordingly provided herein for improving spatial reuse by the wireless network 100 (e.g., a Wi-Fi WLAN) in the presence of competing RATs such as LTE nodes employing inter-RAT channel reservation.

Figure 2:
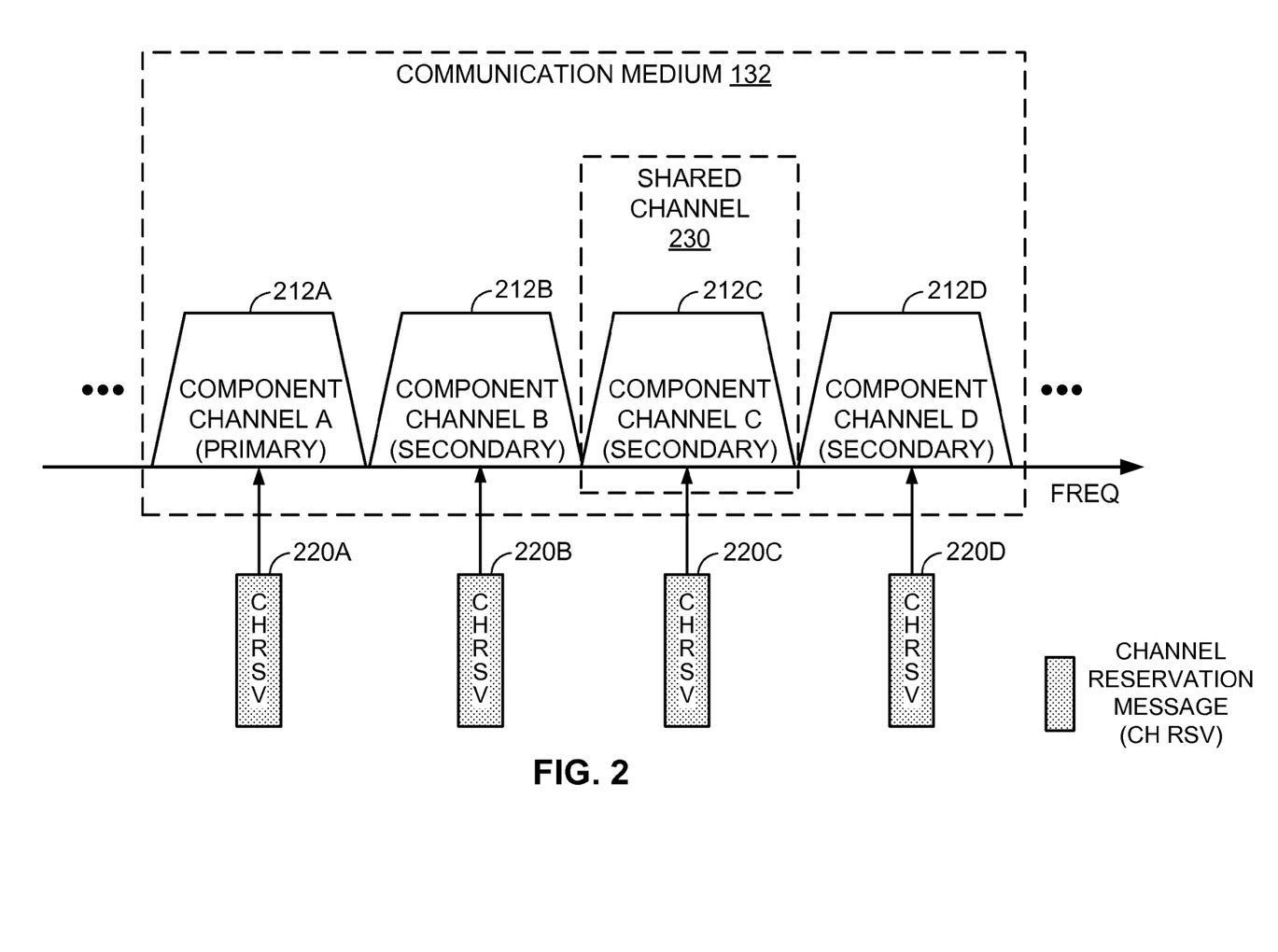
FIG. 2 is a frequency diagram illustrating an example communication medium formed from a plurality of component channels.

FIG. 2 is a frequency diagram illustrating an example communication medium formed from a plurality of component channels. In this example, the communication medium 132 is shown as including component channels 212A-212D.

As shown, each of the component channels 212A-212D may correspond to what may be generally referred to as "primary" or "secondary" channels. For example, the IEEE 802.11 protocol family of standards provides for operation of a primary 20 MHz channel as well as optionally using secondary adjacent channels (e.g., extension channels) spaced ±20 MHz away. The secondary channels may be used for channel bonding to increase the Wi-Fi bandwidth to, for example, 40 MHz, 80 MHz, or 160 MHz. In the scenario where a Wi-Fi access point is using channel bonding of two 20 MHz channels to form a 40 MHz channel, or four 20 MHz channels to form an 80 MHz channel, and so on, one of the 20 MHz channels will be specified as a primary channel and the rest of the channels as secondary channels.

In addition to being used for serving legacy access terminal, sending beacons, sending high Quality of Service (QoS) traffic, and for connection setup exchanges (e.g., association and authentication), primary channels may be used by the access point 110 to coordinate channel reservation messaging. For example, a CTS2S message may only be respected if it is received on a primary channel (e.g., channel 212A in FIG. 2), whereupon the communication medium 132 as a whole will be reserved for the duration specified by the CTS2S message. Otherwise, if a CTS2S message is received only on a secondary channel (e.g., any of channels 212B-212D in FIG. 2), the reservation is effectively ignored.

As is further shown in FIG. 2, a competing RAT such as LTE operating on the communication medium 132 may send a channel reservation message on each of the component channels 212A-212D (illustrated as channel reservation messages 220A-220D in FIG. 2 by way of example) to reserve the communication medium 132 for itself. Sending the channel reservation message on each of the component channels ensures that it is received on a primary channel for known as well as unknown neighboring devices that may have different primary channel designations. At the same time, however, the competing RAT may only intend to occupy or otherwise make use of one of the component channels (shown as a shared channel 230, corresponding to the component channel 212C in FIG. 2). Accordingly, although only a portion of the communication medium 132 needs to be reserved to satisfy the competing RAT's intended use, limitations on the channel reservation mechanism of the RAT employed by the wireless network 100 may result in a sub-optimal restriction on the communication medium 132 as a whole.

With reference again to FIGS. 1A-1B, the channel reservation module 162 may be configured to perform channel reservation message processing and associated functions, such as extracting relevant reservation parameters (e.g., receiver address, reservation duration, etc.), setting the Network Allocation Vector (NAV) of the access point 110 based on the relevant reservation parameters, enforcing deferred access to the communication medium 132 until the channel reservation expires, and so on. The channel reservation module 172 may be similarly configured. The component channel detector 164 and the component channel controller 166 may be configured to collectively process one or more channel reservation messages received for the RAT employed by the wireless network 100 (e.g., Wi-Fi) in accordance with the component-channel-aware techniques provided herein. The component channel detector 174 and the component channel controller 176 may be similarly configured. For simplicity, the description below is provided in the context and with reference to the co-existence manager 160 of the access point 110, but in general, it will be appreciated that the co-existence manager 170 of the access terminal 120 may be similarly configured.

As illustrated in FIG. 2, one or more channel reservation messages may be received to reserve the communication medium 132 for a reservation duration, with the communication medium comprising a plurality of component channels. The component channel detector 164 may be configured to determine a particular ("first") component channel (including one or a set of channels) among the plurality of component channels to be protected for operation of a competing RAT (e.g., LTE) in accordance with the channel reservation messages. The component channel controller 166 may be configured to facilitate communication via the native RAT of the wireless network 100 on another ("second") component channel (including one or a set of channels) among the plurality of component channels during the reservation duration (e.g., by interfacing with and adapting operation of the channel reservation module 162), even though the channel reservation messages may otherwise be conventionally interpreted as requiring reservation of the communication medium 132 and all of its constituent component channels as a whole (e.g., via reception of one of the channel reservation messages on a primary channel). For example, communication via the native RAT of the wireless network 100 may still proceed on a primary channel if that channel is not needed by the competing RAT, as well as any secondary channels that are contiguous with the primary channel (e.g., component channel 212A as a primary channel and component channel 212B as a secondary channel in the example of FIG. 2).

It will therefore be appreciated that the present disclosure provides not only for inter-RAT channel reservation by the competing RAT, but for mitigation of such inter-RAT channel reservation by the native RAT of the wireless network 100, which may only partially honor the reservation.

Several example implementations of the component channel detector 164 and the component channel controller 166 are provided below. It will be appreciated that although the disclosed examples may be discussed individually for illustration purposes, different aspects of the different implementations for the component channel detector 164 and/or the component channel controller 166 may be combined in different ways, not only with other disclosed aspects but also with other aspects beyond the scope of this disclosure, as appropriate. Conversely, it will be appreciated that different aspects of the different implementations for the component channel detector 164 and/or the component channel controller 166 may be used independently, even if described in concert for illustration purposes. Again, it will be appreciated that the component channel detector 174 and the component channel controller 176 of the access terminal 120 may be similarly configured.

Figure 3:
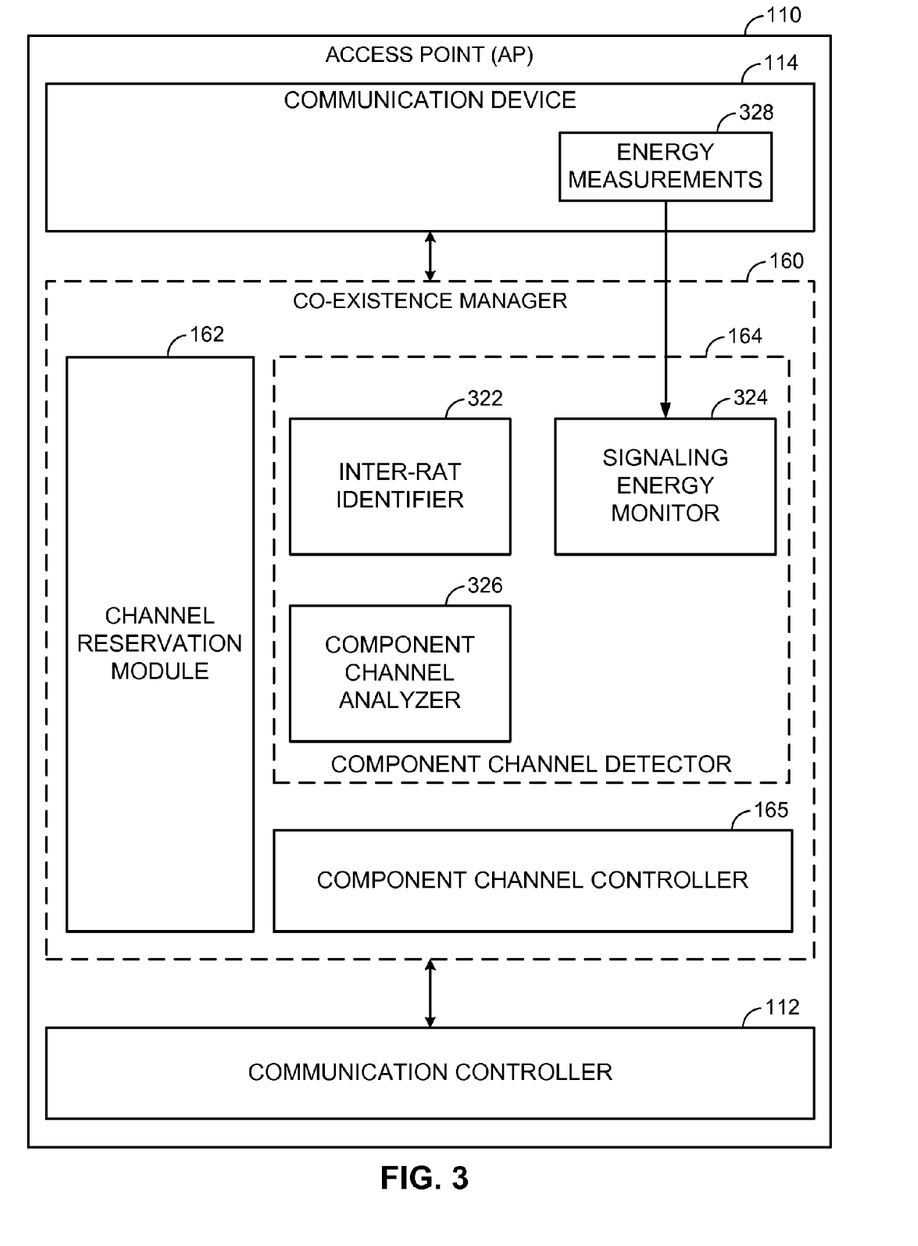
FIG. 3 is a block diagram illustrating an example design for one or more aspects of a co-existence manager.

FIG. 3 is a block diagram illustrating an example design for one or more aspects of a co-existence manager. In this example, the component channel detector 164 of the access point 110 includes an inter-RAT identifier 322, a signaling energy monitor 324, and a component channel analyzer 326.

The inter-RAT identifier 322 may be configured to identify the channel reservation messages as being associated with the competing RAT, rather than with the native RAT of the wireless network 100 defining the channel reservation messages. The identification may be performed in different ways based on different information available. For example, the identification may be performed reactively based on signaling energy observations. If inter-RAT signaling energy is detected within a threshold amount of time (e.g., a few ms) of receiving the channel reservation messages, for example, this may be taken as an indication that the channel reservation messages are associated with another RAT different from the native RAT of the wireless network 100. As an enhancement to improve the accuracy of the correlation, the inter-RAT identifier 322 may attempt to match the signaling energy level of the observed signaling energy with that of the channel reservation messages (e.g., as an associated power signature). Similarly, the inter-RAT identifier 322 may look for a known waveform signature (which may also be referred to as a fingerprint) corresponding to a competing RAT (e.g., a characteristic energy spacing associated with periodic broadcast signaling such as Primary Synchronization Signals (PSS), Secondary Synchronization Signals (SSS), and/or Cell-specific Reference Signals (CRS) in LTE). The inter-RAT identifier 322 may also use information from a co-located radio of the competing RAT itself (e.g., from the secondary RAT transceiver 142), if available.

As another example, the identification may be performed proactively based on the extracted reservation parameters (e.g., reservation duration, receiver address, etc.). If the duration field of the channel reservation messages is substantially larger than a nominal threshold associated with the native RAT of the wireless network 100, for example, this may be taken as an indication that the channel reservation messages are associated with another RAT different from the native RAT of the wireless network 100. The nominal threshold may be selected, for example, based on the largest transmission opportunity (TXoP) defined by the signaling protocols of the native RAT of the wireless network 100 (e.g., 5.484 ms for Wi-Fi), with or without a safety margin (e.g., 5-15 ms) to reduce false positives in practice. In addition or alternatively, if the receiver address field of the channel reservation messages matches a receiver address associated with the competing RAT (e.g., one that has been historically observed to repeat periodically, which may be indicative of an underlying co-existence pattern), for example, this may be taken as an indication that the channel reservation messages are associated with another RAT different from the native RAT of the wireless network 100.

Returning to FIG. 3, the signaling energy monitor 324 may be configured to monitor inter-RAT signaling energy in each of the plurality of component channels during the reservation duration in response to an inter-RAT indicator from the inter-RAT identifier 322. In this example, energy measurements 328 are provided to the signaling energy monitor 324 from the communication device 112 (e.g., via the primary RAT transceiver 140). Any component channels in which inter-RAT signaling energy is detected following channel reservation may give an indication as to which particular component channel(s) the identified competing RAT intends to occupy. The component channel analyzer 326 may thus be configured to determine that a particular (first) component channel (including one or a set of component channels) is the component channel to be protected for operation of the competing RAT. The determination may be based, for example, on the signaling energy being above a threshold in the first component channel. As discussed in more detail above, one or more of the other, unoccupied component channels may then be used by the native RAT of the wireless network 100 without concern for co-channel interference with the competing RAT (e.g., a primary channel and any contiguous secondary channels).

Figure 4:
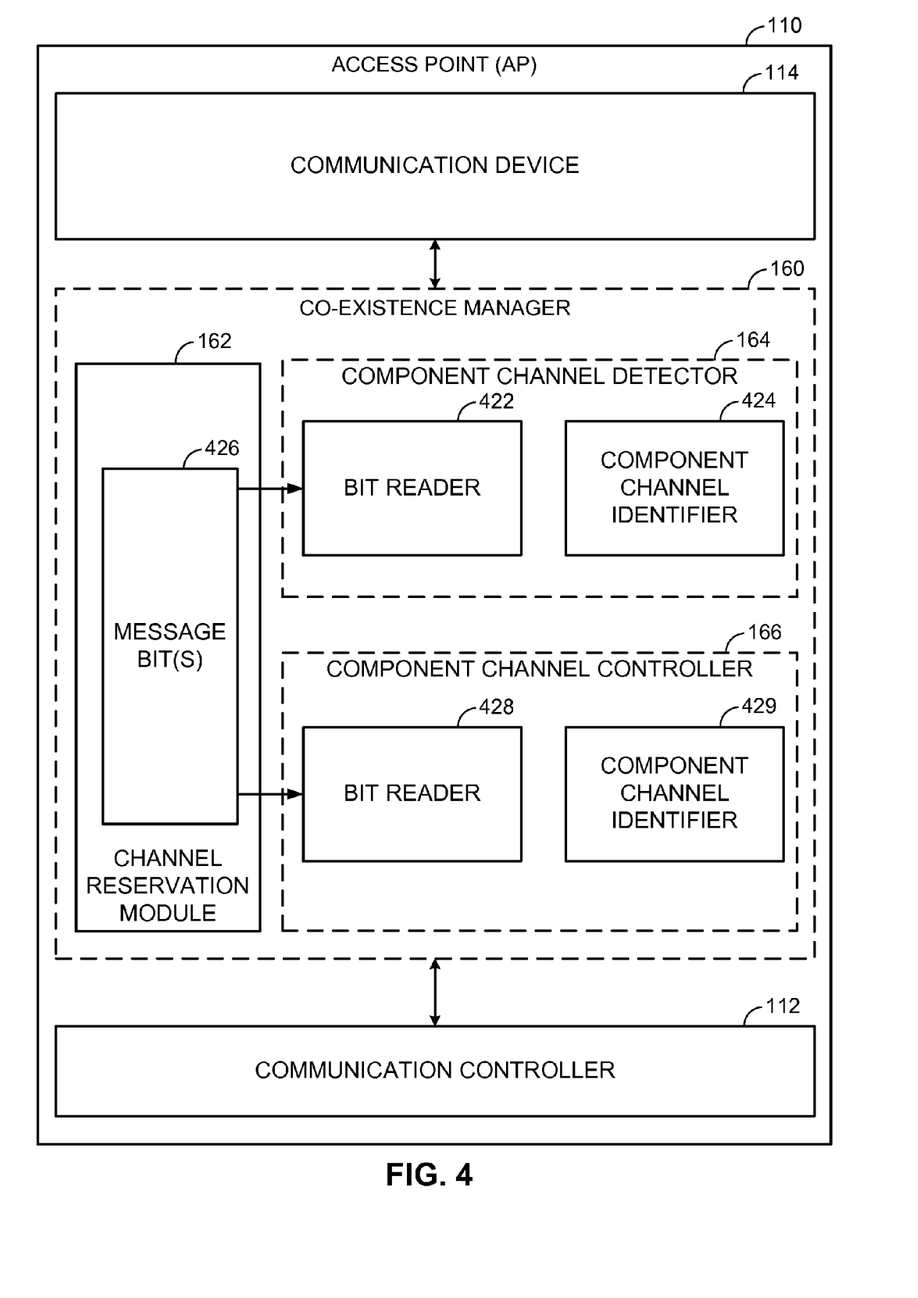
FIG. 4 is a block diagram illustrating another example design for one or more aspects of a co-existence manager.

FIG. 4 is a block diagram illustrating another example design for one or more aspects of a co-existence manager. In this example, the component channel detector 164 of the access point 110 includes a bit reader 422 and a component channel identifier 424.

The bit reader 422 may be configured to read one or more bits of the channel reservation messages for a component channel indicator. In this example, one or more message bits 426 are provided to the bit reader 422 from the channel reservation module 162. The one or more bits may correspond to preexisting but relatively unimportant fields in the channel reservation messages, for example, which can be repurposed to convey component channel indicator information. The particular bits employed may vary from application to application, as well as technology to technology.

Encoding a component channel indicator into one or more of the channel reservation messages themselves allows the competing RAT to signal the particular component channel it desires to reserve, and accordingly provides for more explicit component channel determinations (as well as an explicit indication that the channel reservation messages do indeed correspond to the competing RAT itself, rather than the native RAT of the wireless network 100). Explicit signaling may be particularly advantageous for identifying the relevant component channel(s) when the competing RAT does not intend to transmit during the reserved duration (e.g., reservations made for a measurement period or the like), since signaling energy information may not be available.

The component channel identifier 424 may be configured to identify the particular (first) component channel (including one or a set of channels) that is to be protected for operation of the competing RAT based on the component channel indicator. As discussed in more detail above, one or more of the other, unoccupied component channels may then be used by the native RAT of the wireless network 100 without concern for co-channel interference with the competing RAT (e.g., a primary channel and any contiguous secondary channels).

The component channel indicator may be configured and utilized in different ways. For example, the component channel indicator may correspond to the absolute channel number used by the competing RAT and may be explicitly signaled in one or in each of the channel reservation messages. As another example, the component channel indicator may correspond to an effectively arbitrary value or the like that is used to differentiate the channel reservation message corresponding to the protected component channel as compared to other, unoccupied component channels. Here, the component channel identifier 424 may be configured to compare values of the component channel indicator across the channel reservation messages, and identify the particular (first) component channel as the component channel corresponding to the channel reservation message having a value of the component channel indicator that is distinct.

Figure 5:
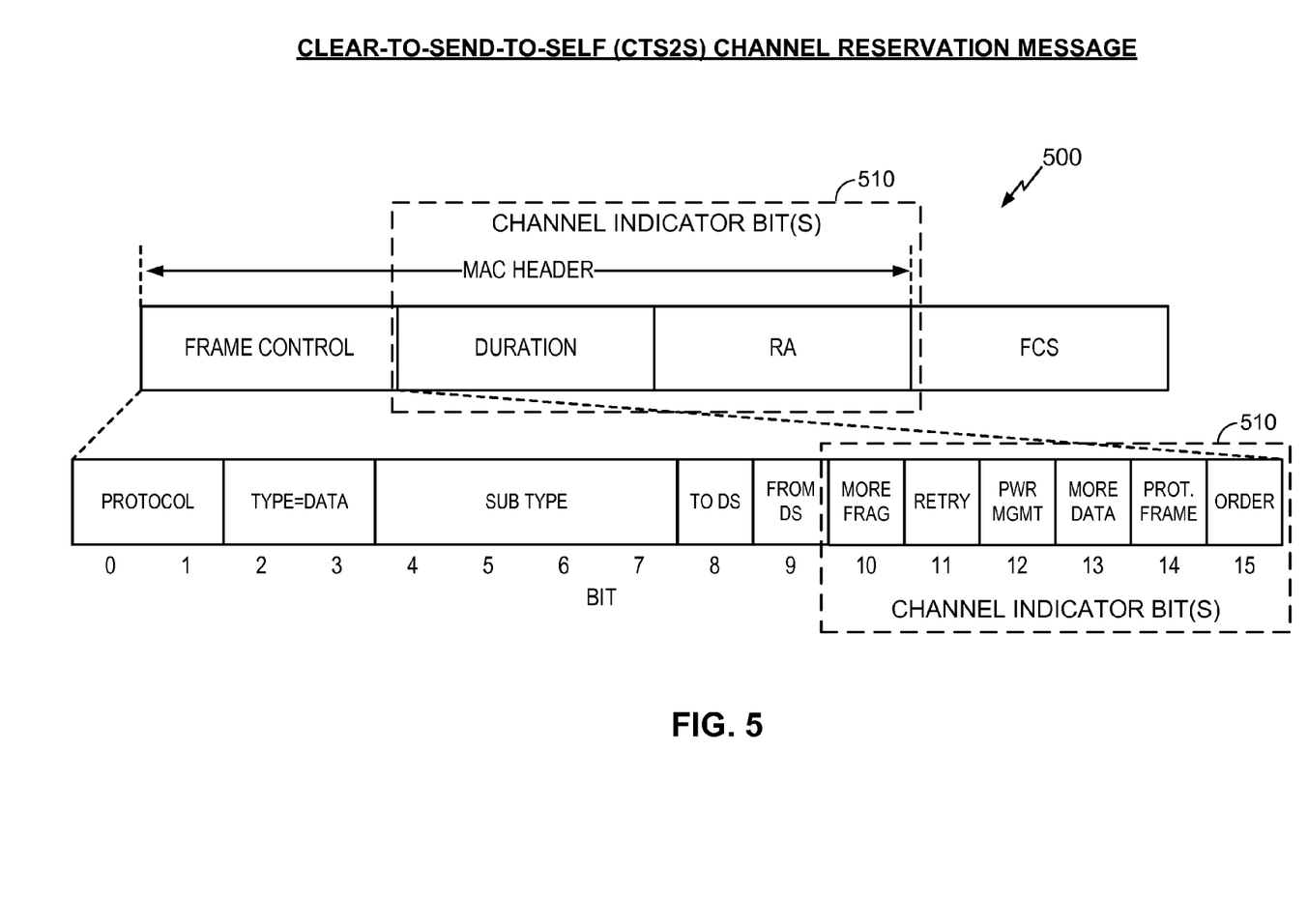
FIG. 5 is a frame format diagram illustrating an example channel reservation message adapted to include one or more repurposed component channel indicator bits.

FIG. 5 is a frame format diagram illustrating an example CTS2S channel reservation message adapted to include one or more repurposed component channel indicator bits. A CTS2S message is shown for illustration purposes only, as a more concrete example in the context of Wi-Fi signaling. It will be appreciated, however, that other channel reservation messages, in Wi-Fi as well as other RATs, may be similarly adapted based on the details of their respective frame formats or the like.

In this example, the component channel indicator is implemented in the Medium Access Control (MAC) header portion of the CTS2S channel reservation message 500. As shown, the MAC header portion of the channel reservation message 500 includes a Frame Control field, a Duration field, and a Receiver Address (RA) field. In some designs, one or more bits 510 of the Frame Control field may be repurposed to serve as a component channel indicator (e.g., a More Fragments bit, a Retry bit, a Power Management bit, a More Data bit, a Protected bit, an Order bit, or a combination thereof). As discussed above, these bits may be used to convey the absolute channel number used by the competing RAT, to differentiate the channel reservation message corresponding to the protected component channel as compared to other, unoccupied component channels (e.g., the Retry bit=0 in component channels 212A, 212B, and 212D, and the Retry bit=1 in the component channel 212C, corresponding to the shared channel 230 in the example of FIG. 2), and so on.

In other designs, one or more bits 510 of the Duration field may be repurposed to serve as a component channel indicator. For example, a special value type may be selected to differentiate the channel reservation message corresponding the protected component channel (e.g., set to an even value) as compared to other, unoccupied component channels (e.g., set to an odd value). In still other designs, one or more bits 510 of the RA field may be repurposed to serve as a component channel indicator. For example, a special value or range of values may be selected to differentiate the channel reservation message corresponding to the protected component channel as compared to other, unoccupied component channels (e.g., a particular range of MAC ID values).

As discussed above, other channel reservation messages, in Wi-Fi as well as other RATs, may be similarly adapted based on the details of their respective frame formats or the like. For example, the Service field of the PLCP header may be repurposed to serve as a component channel indicator (e.g., utilizing the first 7 bits corresponding to the Scrambler Initialization sequence to convey the absolute channel number of the component channel to be protected, with the remaining 9 reserved bits being set to 0).

Returning to FIG. 4, the component channel controller 166 in this example includes its own bit reader 428 and a communication adapter 429. The bit reader 428 may be configured to read one or more bits of the channel reservation messages for a reservation usage indicator, and the communication adapter 429 may be configured to adapt communication of the access point 110 (e.g., via the primary RAT transceiver 140) based on the reservation usage indicator. The reservation usage indicator may be implemented in a similar fashion as described above for the component channel indicator, in one or more bits of the channel reservation messages, which may correspond to preexisting but relatively unimportant fields in the channel reservation messages, for example, repurposed to convey reservation usage information.

As discussed above, temporary channel reservation may be employed by the competing RAT for several different usages, such as protecting downlink transmissions and avoiding inter-RAT collisions (e.g., as part of an SDL co-existence transmission pattern), protecting downlink transmissions and detecting uplink transmissions (e.g., as part of a SA co-existence transmission pattern), detecting radar transmissions (e.g., as part of a DFS function), managing co-located radio interactions (e.g., as part of an IDC scheme), and so on. It may be advantageous (e.g., in terms of still further gains in spectral efficiency) for the component channel controller 166 to handle different reservation usages of the competing RAT in different ways. For example, when co-existing with an SDL transmission pattern, it may be possible for native RAT signaling of the wireless network 100 to continue to be transmitted but at a lower power level, whereas when co-existing with a DFS function, native RAT signaling of the wireless network 100 may be silenced altogether.

Figure 6:
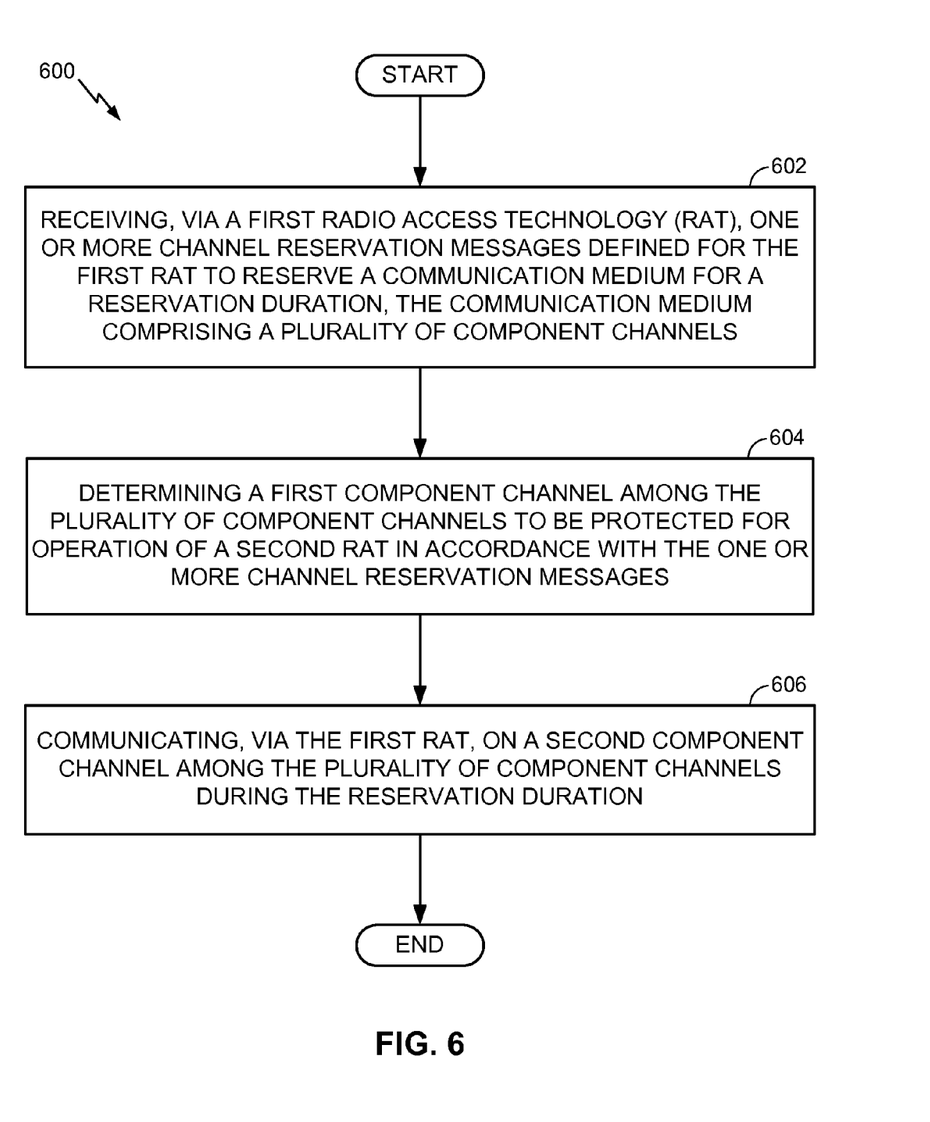
FIG. 6 is a flow diagram illustrating an example method of communication in accordance with the techniques described herein.

FIG. 6 is a flow diagram illustrating an example method of communication in accordance with the techniques described above. The method 600 may be performed, for example, by an access point (e.g., the access point 110 illustrated in FIGS. 1A-1B) or an access terminal (e.g., the access terminal 120 illustrated in FIGS. 1A-1B) operating on a shared communication medium. As an example, the communication medium may include one or more time, frequency, or space resources on an unlicensed radio frequency band shared between LTE technology and Wi-Fi technology devices.

As shown, the access point or access terminal may receive, via a first RAT, one or more channel reservation messages defined for the first RAT to reserve a communication medium for a reservation duration, with the communication medium comprising a plurality of component channels (block 602). The receiving may be performed, for example, by a transceiver such as the primary RAT transceiver 140 or the primary RAT transceiver 150 or the like. The access point or access terminal may determine a first component channel among the plurality of component channels to be protected for operation of a second RAT in accordance with the one or more channel reservation messages (block 604). The determining may be performed, for example, by a processor and memory such as the one or more processors 116 and the one or more memories 118 or the one or more processors 126 and the one or more memories 128 or the like. The access point or access terminal may then communicate, via the first RAT, on a second component channel among the plurality of component channels during the reservation duration (block 606). The communicating may be performed, for example, by a transceiver such as the primary RAT transceiver 140 or the primary RAT transceiver 150 or the like.

As discussed in more detail above, the one or more channel reservation messages may include, for example, at least one of a CTS2S message defined by the first RAT, a RTS message defined by the first RAT, a CTS message defined by the first RAT, a PLCP header defined by the first RAT, a data packet defined by the first RAT, or a combination thereof.

In some designs, the determining (block 604) may include, for example, identifying the one or more channel reservation messages as being associated with the second RAT; monitoring non-first-RAT signaling energy in each of the plurality of component channels during the reservation duration in response to the identifying; and determining the first component channel as the component channel to be protected for operation of the second RAT based on the signaling energy being above a threshold in the first component channel. As an example, the identifying may include detecting non-first-RAT signaling energy within a threshold amount of time of receiving the one or more channel reservation messages; comparing a duration field of the one or more channel reservation messages to a nominal threshold associated with the first RAT; comparing a receiver address field of the one or more channel reservation messages to a receiver address associated with the second RAT; or a combination thereof.

In other designs, the determining (block 604) may include, for example, reading one or more bits of the one or more channel reservation messages for a component channel indicator; and identifying the first component channel as the component channel to be protected for operation of the second RAT based on the component channel indicator. As an example, the identifying may include comparing values of the component channel indicator across a plurality of the one or more channel reservation messages; and identifying the first component channel as the component channel corresponding to the channel reservation message having a value of the component channel indicator that is distinct among the plurality of the one or more channel reservation messages. As another example, the identifying may include reading an absolute channel number from the component channel indicator of at least one of the one or more channel reservation messages; and identifying the first component channel as the component channel corresponding to the absolute channel number.

As also discussed in more detail above, the one or more bits may correspond to a portion of a MAC header or a PLCP header of the one or more channel reservation messages. In addition or as an alternative, the one or more bits may correspond to at least one of a More Fragments bit of a Frame Control field of the MAC header, a Retry bit of the Frame Control field of the MAC header, a Power Management bit of the Frame Control field of the MAC header, a More Data bit of the Frame Control field of the MAC header, a Protected bit of the Frame Control field of the MAC header, an Order bit of the Frame Control field of the MAC header, or a combination thereof. In addition or as an alternative, the one or more bits may correspond to a Duration field of the MAC header, a Receiver Address field of the MAC header, or a combination thereof. In addition or as an alternative, the one or more bits may correspond to one or more Scrambler Initialization bits of a Service field of the PLCP header.

In some designs, the access point or access terminal may read one or more bits of the channel reservation messages for a reservation usage indicator and adapt communication of the first RAT based on the reservation usage indicator by communicating on (i) the second component channel at a first transmission power level or (ii) the first component channel at a second transmission power level that is lower than the first transmission power level.

For convenience, the access point 110 and the access terminal 120 are shown in FIGS. 1A-1B as including various components that may be configured according to the various examples described herein. It will be appreciated, however, that the illustrated blocks may be implemented in various ways. In some implementations, the components of FIGS. 1A-1B may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 7:
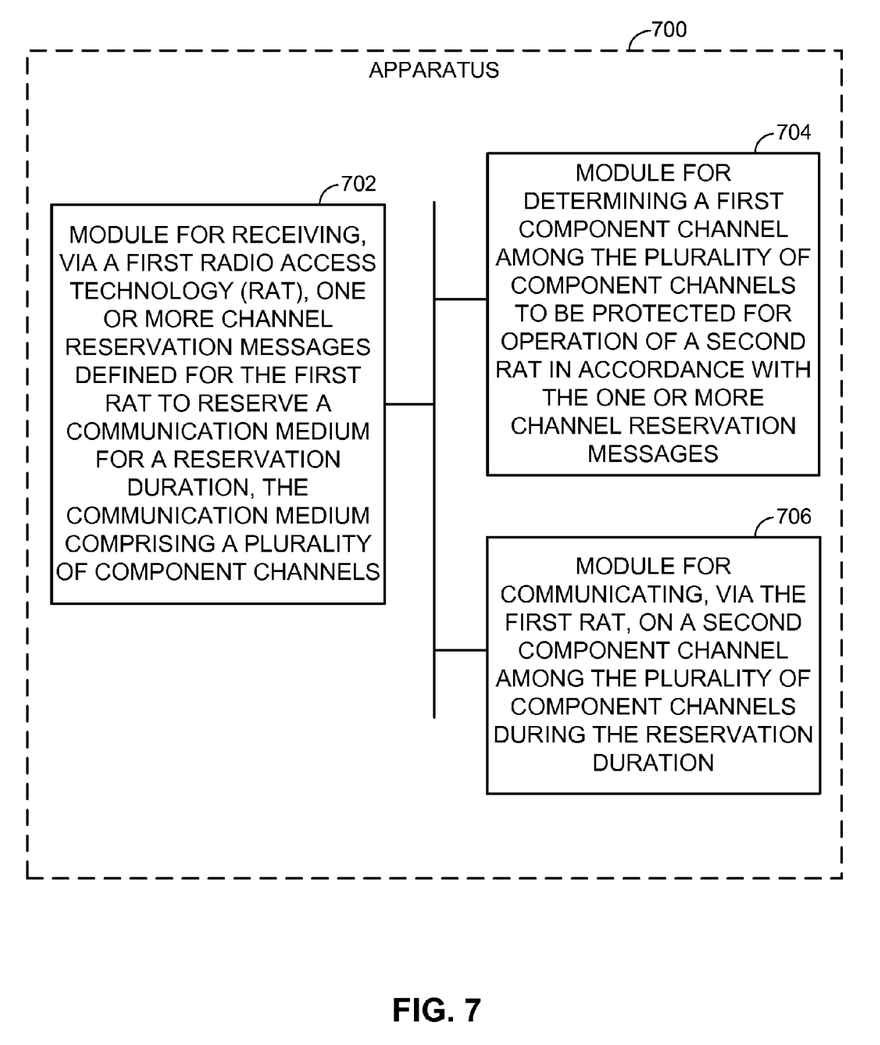
FIG. 7 illustrates an example apparatus represented as a series of interrelated functional modules.

FIG. 7 provide alternative illustrations of apparatuses for implementing the access point 110 and/or the access terminal 120 represented as a series of interrelated functional modules.

FIG. 7 illustrates an example apparatus 700 represented as a series of interrelated functional modules. A module for receiving 702 may correspond at least in some aspects to, for example, a communication device or a component thereof as discussed herein (e.g., the communication device 112 or the communication device 122 or the like). A module for determining 704 may correspond at least in some aspects to, for example, a communication controller or a component thereof as discussed herein (e.g., the communication controller 114 or the communication controller 124 or the like). A module for communicating 706 may correspond at least in some aspects to, for example, a communication device or a component thereof as discussed herein (e.g., the communication device 112 or the communication device 122 or the like).

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
   receiving, via a first Radio Access Technology (RAT), one or more channel reservation messages defined for the first RAT to reserve a communication medium for a reservation duration, the communication medium comprising a plurality of component channels;
   determining a first component channel among the plurality of component channels to be protected for operation of a second RAT in accordance with the one or more channel reservation messages, wherein the determining comprises:
      monitoring non-first-RAT signaling energy in each of the plurality of component channels during the reservation duration in response to identifying the one or more channel reservation messages as being associated with the second RAT; and
      identifying the first component channel to be protected for the operation of the second RAT based on the monitored non-first-RAT signaling energy being above a threshold in the first component channel; and
   communicating, via the first RAT, on a second component channel among the plurality of component channels during the reservation duration.

2. The method of claim 1, the one or more channel reservation messages comprising at least one of a Clear-to-Send-to-Self (CTS2S) message defined by the first RAT, a Request-to-Send (RTS) message defined by the first RAT, a Clear-to-Send (CTS) message defined by the first RAT, a Physical Layer Convergence Protocol (PLCP) header defined by the first RAT, a data packet defined by the first RAT, or a combination thereof.

3. The method of claim 1, wherein the identifying the one or more channel reservation messages as being associated with the second RAT comprises:
   detecting the non-first-RAT signaling energy within a threshold amount of time of receiving the one or more channel reservation messages;
   comparing a duration field of the one or more channel reservation messages to a nominal threshold associated with the first RAT;
   comparing a receiver address field of the one or more channel reservation messages to a receiver address associated with the second RAT; or
   a combination thereof.

4. The method of claim 1, the determining comprising:
   reading one or more bits of the one or more channel reservation messages for a component channel indicator; and
   identifying the first component channel to be protected for the operation of the second RAT based on the component channel indicator.

5. The method of claim 4, the identifying comprising:
   comparing values of the component channel indicator across a plurality of the one or more channel reservation messages; and
   identifying the first component channel based on the first component channel corresponding to one of the channel reservation messages that has a value of the component channel indicator that is distinct among the plurality of the one or more channel reservation messages.

6. The method of claim 4, the identifying comprising:
   reading an absolute channel number from the component channel indicator of at least one of the one or more channel reservation messages; and
   identifying the first component channel based on the first component channel corresponding to the absolute channel number.

7. The method of claim 4, the one or more bits corresponding to a portion of a Medium Access Control (MAC) header or a Physical Layer Convergence Protocol (PLCP) header of the one or more channel reservation messages.

8. The method of claim 7, the one or more bits corresponding to at least one of a More Fragments bit of a Frame Control field of the MAC header, a Retry bit of the Frame Control field of the MAC header, a Power Management bit of the Frame Control field of the MAC header, a More Data bit of the Frame Control field of the MAC header, a Protected bit of the Frame Control field of the MAC header, an Order bit of the Frame Control field of the MAC header, or a combination thereof.

9. The method of claim 7, the one or more bits corresponding to a Duration field of the MAC header, a Receiver Address field of the MAC header, one or more Scrambler Initialization bits of a Service field of the PLCP header, or a combination thereof.

10. The method of claim 1, further comprising:
    reading one or more bits of the channel reservation messages for a reservation usage indicator; and
    adapting communication of the first RAT based on the reservation usage indicator by communicating on (i) the second component channel at a first transmission power level or (ii) the first component channel at a second transmission power level that is lower than the first transmission power level.

11. The method of claim 1:
the communication medium comprising one or more time, frequency, or space resources on an unlicensed radio frequency band.

12. The method of claim 1:
the first RAT comprising wireless local area network (WLAN) technology; and
the second RAT comprising Long Term Evolution (LTE) technology.

13. An apparatus, comprising:
a transceiver configured to receive, via a first Radio Access Technology (RAT), one or more channel reservation messages defined for the first RAT to reserve a communication medium for a reservation duration, the communication medium comprising a plurality of component channels;
at least one processor; and
at least one memory coupled to the at least one processor, the at least one processor and the at least one memory being configured to determine a first component channel among the plurality of component channels to be protected for operation of a second RAT in accordance with the one or more channel reservation messages, the at least one processor and the at least one memory being further configured to:
monitor non-first-RAT signaling energy in each of the plurality of component channels during the reservation duration in response to the one or more channel reservation messages being associated with the second RAT; and
identify the first component channel to be protected for the operation of the second RAT based on the monitored non-first-RAT signaling energy being above a threshold in the first component channel, and
the transceiver being further configured to communicate, via the first RAT, on a second component channel among the plurality of component channels during the reservation duration.

14. The apparatus of claim 13, the one or more channel reservation messages comprising at least one of a Clear-to-Send-to-Self (CTS2S) message defined by the first RAT, a Request-to-Send (RTS) message defined by the first RAT, a Clear-to-Send (CTS) message defined by the first RAT, a Physical Layer Convergence Protocol (PLCP) header defined by the first RAT, a data packet defined by the first RAT, or a combination thereof.

15. The apparatus of claim 13, the at least one processor and the at least one memory being further configured to identify the one or more channel reservation messages as being associated with the second RAT based on:
the non-first-RAT signaling energy being detected within a threshold amount of time of receiving the one or more channel reservation messages;
a comparison of a duration field of the one or more channel reservation messages to a nominal threshold associated with the first RAT;
a comparison of a receiver address field of the one or more channel reservation messages to a receiver address associated with the second RAT; or
a combination thereof.

16. The apparatus of claim 13, the at least one processor and the at least one memory being further configured to:
read one or more bits of the one or more channel reservation messages for a component channel indicator; and
identify the first component channel to be protected for the operation of the second RAT based on the component channel indicator.

17. The apparatus of claim 16, the at least one processor and the at least one memory being further configured to:
compare values of the component channel indicator across a plurality of the one or more channel reservation messages; and
identify the first component channel based on the first component channel corresponding to one of the channel reservation messages that has a value of the component channel indicator that is distinct among the plurality of the one or more channel reservation messages.

18. The apparatus of claim 16, the at least one processor and the at least one memory being further configured to:
read an absolute channel number from the component channel indicator of at least one of the one or more channel reservation messages; and
identify the first component channel based on the first component channel corresponding to the absolute channel number.

19. The apparatus of claim 16, the one or more bits corresponding to a portion of a Medium Access Control (MAC) header or a Physical Layer Convergence Protocol (PLCP) header of the one or more channel reservation messages.

20. The apparatus of claim 19, the one or more bits corresponding to at least one of a More Fragments bit of a Frame Control field of the MAC header, a Retry bit of the Frame Control field of the MAC header, a Power Management bit of the Frame Control field of the MAC header, a More Data bit of the Frame Control field of the MAC header, a Protected bit of the Frame Control field of the MAC header, an Order bit of the Frame Control field of the MAC header, or a combination thereof.

21. The apparatus of claim 19, the one or more bits corresponding to a Duration field of the MAC header, a Receiver Address field of the MAC header, one or more Scrambler Initialization bits of a Service field of the PLCP header, or a combination thereof.

22. The apparatus of claim 13, the at least one processor and the at least one memory being further configured to:
read one or more bits of the channel reservation messages for a reservation usage indicator; and
adapt communication of the first RAT based on the reservation usage indicator by directing the transceiver to communicate on (i) the second component channel at a first transmission power level or (ii) the first component channel at a second transmission power level that is lower than the first transmission power level.

23. The apparatus of claim 13:
the communication medium comprising one or more time, frequency, or space resources on an unlicensed radio frequency band.

24. The apparatus of claim 13:
the first RAT comprising wireless local area network (WLAN) technology; and
the second RAT comprising Long Term Evolution (LTE) technology.

25. A communication apparatus, comprising:
means for receiving, via a first Radio Access Technology (RAT), one or more channel reservation messages defined for the first RAT to reserve a communication medium for a reservation duration, the communication medium comprising a plurality of component channels;

means for determining a first component channel among the plurality of component channels to be protected for operation of a second RAT in accordance with the one or more channel reservation messages, wherein the means for determining comprises:
    means for monitoring non-first-RAT signaling energy in each of the plurality of component channels during the reservation duration in response to identifying the one or more channel reservation messages as being associated with the second RAT; and
    means for identifying the first component channel to be protected for the operation of the second RAT based on the monitored non-first-RAT signaling energy being above a threshold in the first component channel; and
means for communicating, via the first RAT, on a second component channel among the plurality of component channels during the reservation duration.

26. A non-transitory computer-readable medium, comprising:
    code for receiving, via a first Radio Access Technology (RAT), one or more channel reservation messages defined for the first RAT to reserve a communication medium for a reservation duration, the communication medium comprising a plurality of component channels;
    code for determining a first component channel among the plurality of component channels to be protected for operation of a second RAT in accordance with the one or more channel reservation messages, wherein the code for determining comprises:
        code for monitoring non-first-RAT signaling energy in each of the plurality of component channels during the reservation duration in response to identifying the one or more channel reservation messages as being associated with the second RAT; and
        code for identifying the first component channel to be protected for the operation of the second RAT based on the monitored non-first-RAT signaling energy being above a threshold in the first component channel; and
    code for communicating, via the first RAT, on a second component channel among the plurality of component channels during the reservation duration.

27. The communication apparatus of claim 25, wherein the means for determining further comprises:
    means for reading one or more bits of the one or more channel reservation messages for a component channel indicator;
    means for comparing values of the component channel indicator across a plurality of the one or more channel reservation messages; and
    means for identifying the first component channel to be protected for the operation of the second RAT based on the first component channel corresponding to one of the channel reservation messages for which the value of the component channel indicator is distinct among the plurality of the one or more channel reservation messages.

28. The communication apparatus of claim 25, wherein the means for determining further comprises:
    means for reading one or more bits of the one or more channel reservation messages for a component channel indicator;
    means for reading an absolute channel number from the component channel indicator of at least one of the one or more channel reservation messages; and
    means for identifying the first component channel to be protected for the operation of the second RAT based on the first component channel corresponding to the absolute channel number.

29. The non-transitory computer-readable medium of claim 26, wherein the code for determining further comprises:
    code for reading one or more bits of the one or more channel reservation messages for a component channel indicator;
    code for comparing values of the component channel indicator across a plurality of the one or more channel reservation messages; and
    code for identifying the first component channel to be protected for the operation of the second RAT based on the first component channel corresponding to one of the channel reservation messages for which the value of the component channel indicator is distinct among the plurality of the one or more channel reservation messages.

30. The non-transitory computer-readable medium of claim 26, wherein the code for determining further comprises:
    code for reading one or more bits of the one or more channel reservation messages for a component channel indicator;
    code for reading an absolute channel number from the component channel indicator of at least one of the one or more channel reservation messages; and
    code for identifying the first component channel to be protected for the operation of the second RAT based on the first component channel corresponding to the absolute channel number.

* * * * *